US012589558B2

(12) United States Patent
Feht

(10) Patent No.: US 12,589,558 B2
(45) Date of Patent: Mar. 31, 2026

(54) MATERIAL LAYUP APPARATUS AND METHOD FOR PRODUCING WIND TURBINE BLADES USING FIBER PLIES

(71) Applicant: Siemens Gamesa Renewable Energy A/S, Brande (DK)

(72) Inventor: Christian Feht, Aalborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 98 days.

(21) Appl. No.: 18/836,019

(22) PCT Filed: Mar. 9, 2023

(86) PCT No.: PCT/EP2023/056006
§ 371 (c)(1),
(2) Date: Aug. 6, 2024

(87) PCT Pub. No.: WO2023/180080
PCT Pub. Date: Sep. 28, 2023

(65) Prior Publication Data
US 2025/0115011 A1    Apr. 10, 2025

(30) Foreign Application Priority Data

Mar. 23, 2022    (EP) ..................................... 22163810

(51) Int. Cl.
*B29C 31/08* (2006.01)
*B25J 9/02* (2006.01)
(Continued)

(52) U.S. Cl.
CPC .............. *B29C 70/38* (2013.01); *B25J 9/026* (2013.01); *B25J 15/0071* (2013.01); (Continued)

(58) Field of Classification Search
CPC .............................. B29C 31/085; B29C 70/00
See application file for complete search history.

(56) References Cited

U.S. PATENT DOCUMENTS

| | | | |
|---|---|---|---|
| 7,013,943 B2 * | 3/2006 | Sana | ...................... B29C 70/545 156/263 |
| 8,752,293 B2 * | 6/2014 | Jones | ................... B29C 70/304 156/196 |

(Continued)

FOREIGN PATENT DOCUMENTS

| | | |
|---|---|---|
| EP | 2934861 A1 | 10/2015 |
| EP | E3106280 A1 | 12/2016 |

(Continued)

OTHER PUBLICATIONS

PCT International Search Report and Written Opinion of International Searching Authority mailed Jun. 13, 2023 corresponding to PCT International Application No. PCT/EP2023/056006 filed Mar. 9, 2023.

*Primary Examiner* — Atul P. Khare

(57) ABSTRACT

A material layup apparatus (100) for producing wind turbine blades using fiber plies (31), comprising a first gantry (1) with a transversal beam (11) extending over a mold receiving space (10). The first gantry (1) comprising at least one gripping unit (4a,4b) attached to the transversal beam (11) and being moveable both in the transversal direction (T) and in a vertical direction (V) so as to be lowerable into and retractable from the mold receiving space (10). Further, the material layup apparatus (100) has a second gantry (2) comprising a transversal beam (21) extending over the mold receiving space (10) providing a storage area (24) for a stack (3) of fiber plies (31). The second gantry (2) is adapted to be moveable in the longitudinal direction (L) into a ply-pickup position in that the storage area (24) of the second gantry (2) is arranged under the at least one gripping unit (4a,4b) of the (Continued)

first gantry (1) so that at least one ply (31) of the fiber plies (31) provided on the stack (3) of fiber plies (31) can be picked up by the at least one gripping unit (4a,4b).

Thus, a transversal material layup that currently includes many process steps that include manual labor can be automated and by that productivity as well as safety can be increased.

15 Claims, 8 Drawing Sheets

(51) Int. Cl.

| | |
|---|---|
| B25J 15/00 | (2006.01) |
| B29C 70/30 | (2006.01) |
| B29C 70/38 | (2006.01) |
| B29D 99/00 | (2010.01) |
| B65H 3/08 | (2006.01) |
| B29L 31/08 | (2006.01) |
| B32B 38/18 | (2006.01) |

(52) U.S. Cl.
CPC ............ B29C 31/085 (2013.01); B29C 70/30 (2013.01); B29D 99/0025 (2013.01); B29D 99/0028 (2013.01); B65H 3/0816 (2013.01); B29L 2031/085 (2013.01); B32B 38/18 (2013.01); B65H 2701/172 (2013.01)

(56) References Cited

U.S. PATENT DOCUMENTS

| | | | | |
|---|---|---|---|---|
| 9,969,133 | B2* | 5/2018 | Hedges | .................. B66C 19/00 |
| 11,117,332 | B2* | 9/2021 | Encinosa | ............... B29C 70/38 |
| 2009/0148647 | A1 | 6/2009 | Jones et al. | |
| 2012/0138218 | A1* | 6/2012 | Dean | .................. B29D 99/0028 |
| | | | | 156/243 |

FOREIGN PATENT DOCUMENTS

| | | | | | |
|---|---|---|---|---|---|
| EP | | 2981406 | B1 * | 5/2018 | ......... B29D 99/0028 |
| WO | | 03035380 | A1 | 5/2003 | |
| WO | | 2021239954 | A1 | 12/2021 | |
| WO | | 2022049179 | A1 | 3/2022 | |
| WO | WO-2024042029 | A1 * | 2/2024 | ............ B29C 70/38 | |

* cited by examiner

Step a)

Step b)

Step c)

Step d)

Step e)

Step f)

Step g)

Step a1)

Step a)

Step b)

Step c)

Step d)

Step e)

Step f)

Step g)

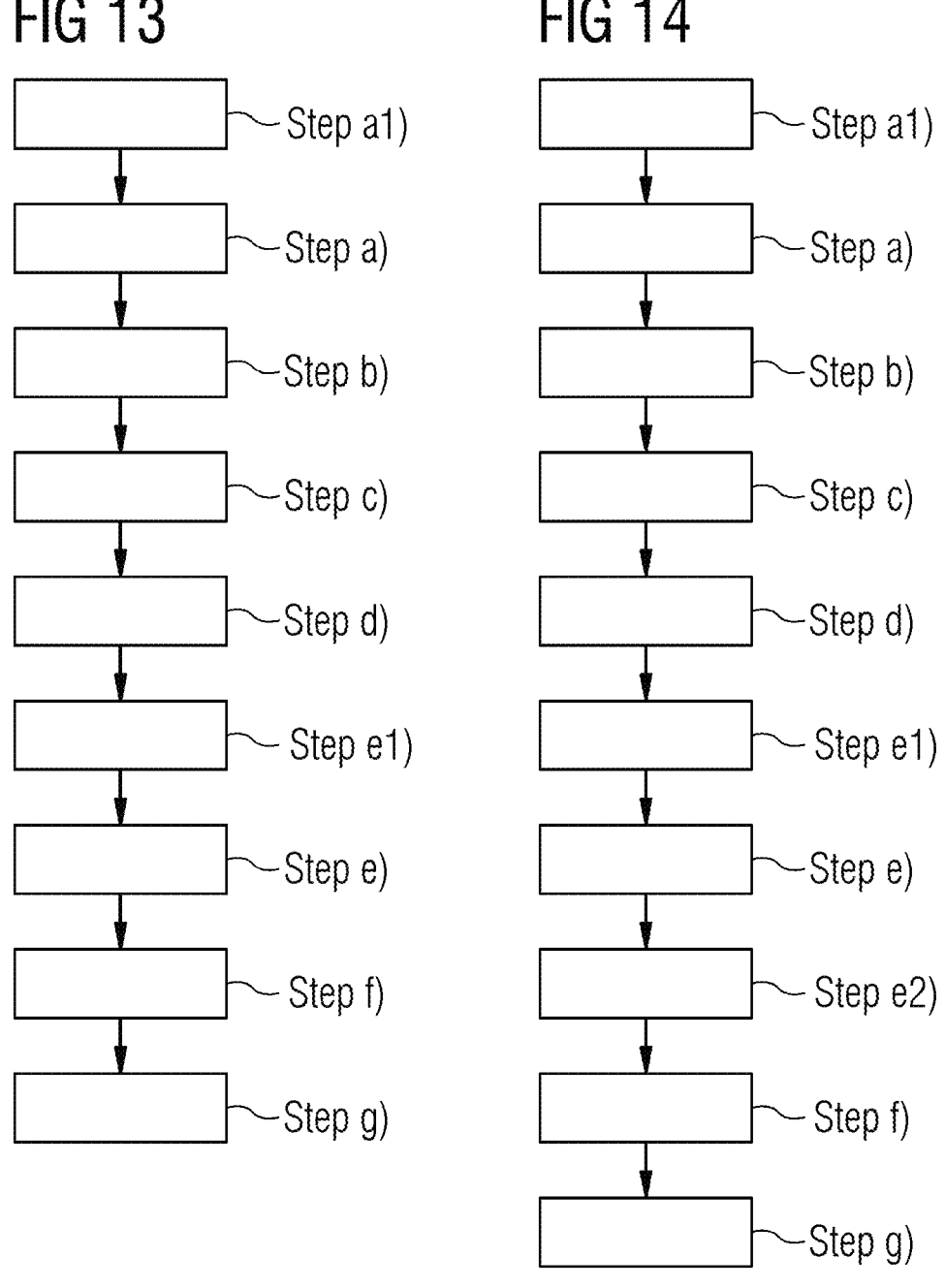

Step a1)
Step a)
Step b)
Step c)
Step d)
Step e1)
Step e)
Step e2)
Step f)
Step g)
Step i)
Step j)
Step k)

Step a1)
Step a)
Step b)
Step c)
Step d)
Step e1)
Step e)
Step e2)
Step f)
Step g)
Step i)
Step i2)
Step i3)
Step j)
Step k)

MATERIAL LAYUP APPARATUS AND METHOD FOR PRODUCING WIND TURBINE BLADES USING FIBER PLIES

The present invention relates to a material layup apparatus for producing wind turbine blades using fiber plies and to a corresponding method.

Wind turbine blades, especially for offshore use, continuously increase in size with the evolvement of technology. Regarding the main dimensions current blades can reach a root diameter of approximately 5 m, a blade length of over 100 m while typical chord lengths can reach up to 7 m. Although the dimensions are literally tremendous the production of wind turbine blades still includes many steps that require manual labor. The manual share in the production is mainly relating to the layup process of fiber plies that together with suitable core materials such as balsawood are comprised in the shell of the blade. A side effect to the growing dimensions of the blades is that more and more material has to be placed into molds so that the share of manual labor increases equally, in particular non-linearly due to the advanced load situation.

In the production of wind turbine blades there are generally two fundamentally different approaches with regards to the material layup of fiber plies: On the one hand a root to tip material layup and on the other hand a transversal material layup.

The present invention relates to the production of wind turbine blades according to the transversal material layup approach.

Within the transversal material layup approach there are the two subtypes of butterfly production and the Integral-Blade® technology.

According to the butterfly production approach the upper and lower shell of the blade are laminated in separate molds. After the shells have been cured the upper and lower shell are assembled or "folded" and glued together by glue joints at both the leading edge and the trailing edge of the blade.

The IntegralBlade® technology that is described in detail in EP 1310351A1 avoids these glue joints that are both disadvantageous from an aerodynamic perspective and a mechanical stiffness perspective. Rather, the entire blade is produced as a single piece with continuous fiber plies at the leading and the trailing edge.

The production of wind turbine blades according to the IntegralBlade® technology is described briefly in the following.

The production starts with a lower layup to form the layers of the lower shell. Therein typically two workers are positioned at opposing longitudinal edges of a lower mold that place the plies individually into the lower mold so that there is a predefined transverse material excess beyond one of the longitudinal edges of the mold. In practice this transverse material excess is stored in a structure called "deep gutter" for later use in the production process. After placing, the plies need to be adequately positioned and draped into the lower mold so that they homogeneously abut against the lower mold or against neighboring layers of the material layup.

Each of the steps of placing, positioning and draping re-quires manual labor that is error and injury prone, especially when the involved workers are inattentive. The ply layup is repeated along the length of the blade as often as required to reach the number and position of plies according to the technical specifications of the specific blade. The number of plies can typically reach several thousands of individual sheets. In regard to the overall trend of increasing blade dimensions, the number of plies and their dimensions increase significantly, putting even more pressure on manual labor and the risk of injuries.

After the lower layup is completed one or more mandrel (s) are placed into the lower mold on top of the lower material layup. When the mandrel(s) have been placed, the upper layup is made. Whenever "mandrel" is used in the singular herein this has the meaning of "at least one mandrel". If more than one mandrels are used, the mandrels may be separated in the transversal and/or longitudinal direction.

To create a circumferentially closed ply structure the transverse material excess that has been provided during the lower layup is pulled manually, typically with the help of ropes, over the mandrel. After the ply has been fully pulled from one longitudinal edge of the mold to the other longitudinal edge the position of the fiber ply has to be corrected so it is correctly placed according to the technical specifications of a specific blade and the ply has to be draped so as to abut against the mandrel or neighboring layers of the material layup homogeneously and without wrinkles.

Especially the step of pulling the transverse material excess over the mandrel(s) can be detrimental to the quality of the material layup as due to friction between the ply that is pulled over and the mandrel(s) or layers that have already been placed on the mandrel(s) the fiber structure of the ply that is being pulled over can be damaged. Further, due to the already mentioned root diameter of up to 5 m, manual labor cannot control and adjust the upper plies when pulling them over the blade.

But the manual labor steps are not only disadvantageous from a quality perspective. As the fiber plies with the involved dimensions in the transversal or circumferential direction and a width of up to 1300 mm are quite heavy the execution of these manual labor steps means an enormous physical strain on the workers. As most jurisdictions impose various limitations with regards to labor safety (e.g. maximum allowable lifting weights, ergonomics specifications) on employers the retention of the manual labor steps implies a barrier for both the dimensions of the blades that can be produced and for any potential productivity gains. For example, productivity could be significantly improved by increasing the width of the individual plies, however this is jeopardized by potential HSE (Health, Safety and Environment) issues.

After all, the process steps in the production of wind turbine blades according to a transversal layup approach, in particular according to the IntegralBlade® technology, that require manual labor practically impose a lower limit to the layup time. This is an important cost factor that currently cannot be addressed as no automation solution is available for the transversal material layup process that would be operable at an industrial scale while meeting the required cycle time and setup & operating cost scale.

Therefore, it is one object of the present invention to provide an improved material layup apparatus and method for producing wind turbine blades using fiber plies that, preferably, eliminates at least some of the above technical disadvantages and allows for an automation of the production and thus both increases production speed and lowers costs, in particular. Both factors are strongly related in wind industry.

Accordingly, a material layup apparatus for producing wind turbine blades using fiber plies is provided.

The material layup apparatus comprises a first gantry with a transversal beam extending over a mold receiving space in a transversal direction of the mold receiving space. The first gantry further comprises at least one gripping unit attached to the transversal beam that is moveable both in the transversal direction and in a vertical direction so as to be lowerable into and retractable from the mold receiving space. The material layup apparatus further comprises a second gantry comprising a transversal beam extending over the mold receiving space in a transversal direction of the mold receiving space. The second gantry provides a storage area for a stack of fiber plies. Both the first and the second gantry are moveable along a longitudinal direction of the mold receiving space. The second gantry is adapted to be moveable in the longitudinal direction into a ply-pickup position in that the storage area of the second gantry is arranged under the at least one gripping unit of the first gantry so that at least one ply of the fiber plies provided on the stack of fiber plies can be picked up by the at least one gripping unit.

In embodiments the first gantry and/or the second gantry can comprise at least one support holding the respective transversal beam at its height position. In particular, the first gantry and/or the second gantry can comprise two supports arranged at opposing sides of the respective transversal beam. The at least one support can, in particular, be provided as a vertically extending strut that is supported on the ground.

The first and/or second gantry may be provided in the form of a portal crane that features both the respective transversal beams and strut(s) made from a mechanically stiff material, in particular steel.

In embodiments the storage area can be provided by or attached to the transversal beam of the second gantry. For example, the transversal beam of the second gantry can comprise a storage surface for the stack of fiber plies or a separate structure is attached to the transversal beam that provides an appropriate storage surface.

In embodiments the transversal beam of the second gantry is arranged at a lower height than the transversal beam of the first gantry, which facilitates bringing the second gantry into its ply-pickup position and also facilitates the ply pickup from the stack.

In the ply-pickup position the transversal beam of the second gantry is in particular at least partially arranged under the transversal beam of the first gantry.

Directional designations such as "longitudinal", "transversal" and/or "vertical" refer to a shape of a mold of a rotor blade to be arranged in the mold receiving space.

"Gantry" herein shall have the meaning of a mechanically stable structure that is able to position the respective transversal beams at their desired vertical position and being strong enough to withstand any forces occurring during operation of the material layup apparatus. Gantry is to be understood broader than the language may imply and in its broadest understanding does not imply any specific structure.

The material layup apparatus according to the invention thus provides an effective automation solution for the steps of placing and positioning the plies into the (lower) mold. This has a significant potential for productivity gains as the width of the plies involved therein is not limited anymore by HSE issues. For example, the width of the plies under implementation of the material layup apparatus according to the invention can be increased from around 650 mm to at least 1500 mm, which has a significant impact of the layup time as the number of required individual plies reduces equally with the increased width. Beyond the advantages with regards to the layup time the implementation of the material layup apparatus according to the invention is also beneficial from a quality perspective: As the position of the gripping unit(s) is controllable in three degrees of freedom of movement a positioning exactly to the technical specifications of a specific blade type can be ensured with unprecedented accuracy.

To compensate for tolerances both in the dimensions of the individual plies and in the positioning of the (lower) mold in the mold receiving space the material layup apparatus can be equipped with at least one optical detection device, e.g., a camera, that detects the position of the ply as well as the position of the (lower) mold so that deviations from the nominal can be appropriately taken into account during positioning. Potential deviations can be offset by the relative position of both gantries to each other.

When implementing the material layup apparatus according to the invention in the production of wind turbine blades manual labor steps accordingly can be reduced to an absolute minimum. Workers may still be required though, however their task in the production will change and tend to include tasks that are more ergonomic than before.

In embodiments of the material layup apparatus may comprise a mold that is received in the mold receiving space. The mold in particular may comprise at least a lower mold. In particular the lower mold can have two longitudinal edges extending essentially in the longitudinal direction. When using the material layup apparatus in a production process at least a section of at least one of the longitudinal edges of the lower mold may be provided with ply-fixation elements, in particular comprising a rake structure or finger structure, that are adapted to fixate sections of fibers plies at the longitudinal edge. In particular opposing sections of both longitudinal edges of the lower mold may be provided with ply-fixation elements.

According to a further embodiment the first gantry comprises at least one further gripping unit attached to the transversal beam that is moveable both in the transversal direction and in the vertical direction so as to be lowerable into and retractable from the mold receiving space.

This facilitates the handling of the typically bendy plies drastically as the plies can be gripped by the gripping unit and the further gripping unit in sections remote from each other so that a tendency of the plies to deform under gravity can be controlled more easily. This has a positive influence on both the ply pickup and the placing of the plies in the (lower) mold. With two gripping units the plies can be beneficially picked up in opposing transversal end sections thereof and subsequently can be placed on the opposing longitudinal edges of the mold. The placing by the gripping unit and the further gripping unit can be performed serially or simultaneously.

At least one of the gripping unit and the further gripping unit may be selectively activable. "Activatable" shall have the meaning that a gripping process that is effectable by the gripping unit and/or the further gripping unit can be controlled or in other words the gripping unit and/or the further gripping unit can be transferred from a non-gripping state into a gripping-state and back. This may allow for a controlled and accurate placement of the plies.

According to a further embodiment the first gantry comprises at least one draping unit attached to the transversal beam that is both moveable in the transversal direction and in the vertical direction so as to be lowerable into and retractable from the mold receiving space. In particular the first gantry can comprise at least one further draping unit attached to the transversal beam that is both moveable in the transversal direction and in the vertical direction so as to be lowerable into and retractable from the mold receiving space.

The gripping unit, the further gripping unit and the at least one draping unit can be adapted to be moveable along the full longitudinal extension or only a portion of the longitudinal extension of the first gantry individually without interfering with each other. In certain embodiments it is possible that the draping unit and/or the further draping unit—with respect to their positioning in the transversal direction—is/are in particular arranged between the gripping unit and the further gripping unit.

According to another embodiment the first and/or second gantry are guided in the longitudinal direction of the mold receiving space on at least one guide rail. The first and/or second gantry can be provided with one or more wheels so as to be guided on the at least one guide rail. The first and/or second gantry can comprise at least one wheel that is connected to a drive element, in particular an electric motor, to effect the movement in the longitudinal direction along the guide rail. In a special embodiment the first gantry and/or second can be guided on two guide rails that extend in the longitudinal direction on two transversally opposing sides of the mold receiving space. In embodiments a guide rail of the second gantry can be—with respect to the transversal direction of the mold receiving space—closer to the mold receiving space than a guide rail of the first gantry. In other words: The guide rail(s) of the first gantry may extend transversally outwardly with respect to the guide rail(s) of the second gantry. I particular the guide rail(s) of the first and second gantry may extend in parallel. This enables a relative positioning of both gantries.

In other embodiments the at least one guide rail that guides the first and/or second gantry in the longitudinal direction may be attached to a wall or a roof of a production facility in that the material layup apparatus is installed.

In other embodiments the movability of the first and/or second gantry in the longitudinal direction may be realized by mounting the first and/or second gantry to at least one auto guided vehicle (AGV). This has the advantage that no rails are required which facilitates installation of the material layup apparatus in a production facility.

Alternatively, or additionally the transversal beam of the first and/or second gantry can have a larger transversal extension than a mold adapted to be received in the mold receiving space. In particular, the first and/or second gantry can be significantly wider than the mold so that with the mold arranged in the mold receiving space there is a transversal spacing between the longitudinal edges of the mold and the respective transversal end of the gantries. This is in particular beneficial as this allows the plies provided on the stack of plies to be much wider that the transversal extension of a mold received in the mold receiving space. This makes it easily possible to provide the transverse material excess of the at least one ply in a way so that it can be handled efficiently by the gripping unit and/or the further gripping unit. In addition, this transversal spacing allows to create a safe working zone for workers working on or checking the material layup. For this reason a platform that runs along the longitudinal direction of the mold may be arranged in the transversal spacing.

In embodiments the transversal beam of the second gantry can have a smaller transversal extension than the transversal beam of the first gantry. This facilitates the second gantry being moved into its ply-pickup position as any supports of the second gantry will not interfere with any supports of the first gantry while the first and second gantry are relatively moved in the longitudinal direction.

In a further embodiment at least one of the gripping unit, the further gripping unit, the draping unit and/or the further draping unit comprise an end-effector selected from the group comprising a vacuum gripper, in particular including at least one suction cup, a needle gripper, a finger gripper and a combined vacuum-needle gripper.

In certain embodiments it can be beneficial if the gripping unit and/or the further gripping unit comprise a combined vacuum-needle gripper. An at least one needle of the combined vacuum-needle gripper can be retractable. A combined vacuum-needle gripper is ideally adapted to perform different gripping tasks: On the one hand its needle gripping function allows for the selective pickup of a predefined number of plies, whereas its vacuum gripping function allows for a controlled placement of plies close to the surface of a desired placing region, in particular the lower mold. For placing the at least one needle may be retracted so that it does not collide with the surface of the desired placing region.

Additionally or alternatively, it may be beneficial if the draping unit and/or the further draping unit comprise a vacuum gripper. Vacuum grippers are ideal for gentle handling of the plies and therefore are perfectly adapted for draping purposes.

In other embodiments it may be possible that the draping unit and/or the further draping unit do not comprise any grippers but a passive end-effector. The passive end-effector can comprise at least one draping surface that can in particular have a curved shape so not to damage the fiber structure of the plies when moved in a transversal direction over their surface.

According to a further embodiment at least one of the gripping unit, the further gripping unit, the draping unit and the further draping unit are attached to a cartesian robot mounted to the transversal beam of the first gantry.

The Cartesian robot may in particular have two degrees of freedom of movement: In the transversal direction and in the vertical direction. This means that the gripping unit, the further gripping unit, the draping unit and/or the further draping unit can be moved with the Cartesian robot in the transversal and in the vertical direction. Movement in the longitudinal direction is accomplished by the longitudinal movability of the first gantry. Alternatively to a Cartesian robot the gripping unit, the further gripping unit, the draping unit and/or the further draping unit may be attached to a wire robot mounted to the transversal beam of the first gantry. The invention however is explicitly not limited to the motion devices mentioned above but may also comprise alternatives that the skilled person considers suitable for the use in the material layup apparatus according to the invention.

According to a second aspect a material layup method for producing wind turbine blades using fiber plies is provided. The method is executed using an apparatus according to the invention and a lower mold provided in the mold receiving space of the apparatus.

The method comprises the steps,
a) moving the second gantry in a longitudinal direction into its ply-pickup position in that the storage area of the second gantry is arranged under the at least one gripping unit of the first gantry,
b) lowering the gripping unit of the first gantry in the vertical direction towards the storage area of the second gantry, activating the gripping unit and picking up at least one ply of the fiber plies provided on the stack of fiber plies with the at least one gripping unit,
c) moving the gripping unit in the vertical direction to lift off the at least one ply of the stack of fiber plies, d) Retracting the second gantry in a longitudinal direction so that the storage area of the second gantry is displaced longitudinally from the gripping unit of the first gantry, e) lowering the gripping unit of the first gantry towards the lower mold and placing the at least one ply on a surface of the lower mold, f) de-activating the gripping unit and retracting the gripping unit in the vertical direction, g) placing a mandrel inside the lower mold on top of the at least one ply placed inside the lower mold.

In case the storage area of the second gantry has not been provided with a stack of fibers plies before step a) the method may comprise the step: Providing a stack of fibers plies in the storage area of the second gantry. Therein the fiber plies may be provided as individual single layers. Alternatively, the individual plies may be provided on the stack of fiber plies with one or more folds so that at the transversal ends of the stack of fiber plies the individual plies are provided in at least two neighboring layers comprising at least two folding sections that are folded around the longitudinal axis. This has the advantage that the required storage space in the transversal direction can be minimized and plies with a transversal extension longer than the transversal extension of the storage area can be easily provided thereon.

The plies may comprise glass and/or carbon fibers and or other reinforcement fibers. The plies may comprise a bi- or tri-directional fiber web and/or a unidirectional structure. The plies may be provided in the form of a dry fiber web (unimpregnated) but may also be provided as a pre-impregnated fiber web, in particular as so called prepregs.

When using a gripping unit comprising a combined vacuum-needle gripper the method may comprise the optional step that is performed before the placing in step g): Retracting at least one needle of the combined vacuum-needle gripper before the ply contacts a surface of the lower mold while maintain vacuum suction to ensure a continued holding of the ply, de-activating vacuum suction after the ply is placed in the lower mold. This optional step ensures the nearest possible placing of the ply in the lower mold and both avoids damage to the mold's surface and to the needles of the combined vacuum-needle gripper.

In embodiments the method may comprise in the execution of step b)

lowering the further gripping unit of the first gantry in the vertical direction towards the storage area of the second gantry, activating the further gripping unit and picking up at least one ply of the fiber plies provided on the stack of fiber plies with the at least one further gripping unit.

Additionally step c) may comprise moving the further gripping unit in the vertical direction to lift off the at least one ply of the stack of fiber plies.

Additionally step e) may comprise lowering the further gripping unit of the first gantry towards the lower mold and place the at least one ply on a surface of the lower mold.

Further, step f) may comprise de-activating the further gripping unit and retracting the further gripping unit in the vertical direction.

Therein in particular the gripping unit and the further gripping may be operated simultaneously.

This facilitates the handling of the typically bendy plies drastically as the plies can be gripped by the gripping unit and the further gripping unit in sections remote from each other so that a tendency of the plies to deform under gravity can be controlled more easily. This has a positive influence on both the ply pickup and the placing of the plies in the (lower) mold.

According to yet another embodiment of the method step b) can further comprise: The gripping unit and the further gripping unit pick up the at least one ply in opposing transversal sections thereof and wherein in step e) the gripping unit and the further gripping unit place the at least one ply on opposing longitudinal edges of the lower mold.

In addition, the method according to a further embodiment may comprise step a1) placing ply-fixation elements, in particular comprising a rake structure or finger structure, on the opposing longitudinal edges of the lower mold, and wherein in step e) the gripping unit and the further gripping unit fixate the at least one ply on the ply-fixation elements on the opposing longitudinal edges of the lower mold.

Step a1) may in particular be performed as an initial step of the method.

In particular it can be foreseen that the gripping unit and the further gripping unit apply a certain pressure on the ply in order to fixate it on the ply-fixation elements. In particular the ply-fixation elements may at least partially penetrate into a structure of the at least one ply in order to fixate it properly at the respective longitudinal edge of the lower mold.

The lower mold can comprise a collar portion that extends radially away from an inner hollow space of the lower mold. The ply-fixation elements can be in particular provided on this collar portion, e.g. on a front face and/or side face of the collar portion. The ply-fixation elements can be understood as an auxiliary tooling that is to be removed in a subsequent step before closing the lower mold with an upper mold.

According to a further embodiment the method may comprise step e1) relatively transversally moving the gripping unit and the further gripping unit to decrease their distance so that the at least one ply hangs freely between the gripping unit and the further gripping unit with a curvature that approximately corresponds to a curvature of the lower mold. Step e1) may be performed before step e).

The desired transversal spacing between the gripping unit and the further gripping unit after the adjustment in step e1) corresponds to a circumferential length between the two opposing longitudinal edges of the lower mold. In other words the aim of the adjustment is that the ply can be placed into the lower mold in a manner that neither creates excessive tension on the ply nor leaves an unwanted material surplus that could create wrinkles.

In particular the positioning of the gripping unit and the further gripping unit after step e1) may equal a transversal position of the opposing longitudinal edges of the lower mold. In other words after step e1) the gripping unit may be arranged above one of the longitudinal edges of the lower mold while the further gripping unit may be arranged above the other longitudinal edge of the lower mold.

Yet another embodiment of the method may comprise the following step:

e2) lowering the draping unit of the first gantry towards the lower mold until the draping unit contacts the at least one ply placed in the lower mold, through the draping unit applying a predefined pressure on the at least one ply, and moving the draping unit in a transversal direction while continuously adjusting a vertical position of the draping unit to correspond to the curvature of the lower mold so that the at least one ply is draped homogeneously into the lower mold along its transversal extension.

Step e2) may be performed after step e) and in particular before step f).

Draping is an important step in the lower layup as this ensures, especially in complex sections of the curvature of the lower mold, that the ply tightly and wrinkle-free contacts the surface of the lower mold. Without draping potential problems regarding an inhomogeneous ply density in the radial direction and/or wrinkles may occur which is generally disadvantageous.

In some embodiments the further draping unit may be used additionally to drape the at least one ply into the lower mold. The draping unit and the further draping unit may be in particular moved along the transversal direction under continuous adjustment of their vertical position to the curvature of the lower mold from transversally opposing sides to a transversal center of the mold or starting from the transversal center of the lower mold transversally to the outer sides of the mold, e.g. towards the longitudinal edges of the lower mold. This has the advantage that the draping speed can be increased as two draping units can be operated simultaneously.

Moreover, the method according to another embodiment may comprise in step b) the at least one ply is picked so that a transverse material excess is provided beyond the gripping unit or the further gripping unit.

Additionally in step e) the at least one ply is placed into the lower mold so that at least a portion of the transverse material excess hangs down from one of the longitudinal edges of the lower mold, wherein preferably a transversal end section of the transverse material excess is fixated on the ply-fixation elements on one of the longitudinal edges of the lower mold.

The length of the transverse material excess, seen in the transversal direction, is dimensioned in a way so that it is at least as long as a circumferential length of an upper side of the mandrel (that at this stage is not yet placed in the lower mold). Preferably the length of the transverse material excess exceeds the circumferential length of the mandrel to a certain extend to allow for a fixation of its end section at the longitudinal edge of the lower mold. Fixating the transversal end section of the transverse material excess on the ply-fixation elements has the benefit that this facilitates later pickup of said transversal end section.

If providing a transverse material excess during step b) this may be particularly beneficially combined with the embodiment according to that the plies are provided on the stack of fiber plies with one or more folds therein as this facilitates the provision of the transverse material excess with the required length.

Furthermore, the method according to yet another embodiment can comprise the following steps:

h) picking up the transversal end section of the transverse material excess with the gripping unit or the further gripping unit and lifting the transverse material excess by moving the gripping unit or the further gripping unit used to pick up the transversal end section of the transverse material excess in the vertical direction, i) moving the gripping unit or further gripping unit used to pick up the transversal end section of the transverse material excess at least in the transversal direction to pull the transverse material excess over the mandrel placed in the lower mold until the gripping unit or further gripping unit used to pick up the transversal end section of the transverse material excess reaches a transversal position of the other longitudinal edge of the lower mold, j) lowering the gripping unit or further gripping unit used to pick up the transversal end section of the transverse material excess unit until the transversal end section of the transverse material excess contacts the other longitudinal edge of the lower mold, k) fixating the transversal end section of the transverse material excess at the other longitudinal edge of the lower mold, in particular on the ply-fixation elements provided thereon.

Steps h) to k) may be performed after step g).

Vertical lifting in step h) is performed as high as necessary to pull the transverse material excess over the mandrel without the gripping unit or the further gripping unit colliding with an upper boundary of the mandrel. In other words the gripping unit or further gripping unit used to lift the transverse material excess must be lifted higher than a maximum height of the mandrel. Lifting in the vertical direction has the advantage that the lifted ply does not or only marginally contact the mandrel respectively other layers of the material layup that had been previously placed on the mandrel. Contact between the ply that is being pulled over the mandrel and the mandrel respectively other layers of the material layup that had been previously placed on the mandrel, especially when including tangential movement, can create shear-forces that are generally disadvantageous as this can cause damage to the fiber structure of the ply. Further, it potentially leads to deviations of the already placed layup when placing a new ply. Avoiding such disadvantageous contact therefore increases the overall quality of the material layup.

In embodiments it is possible that the movement of the gripping unit or further gripping unit used to pick up the transversal end section of the transverse material excess during the pulling over in step i) includes both a vertical and transversal component. In particular it can be possible that the griping unit or further gripping unit are moved so as to follow a curvature of the mandrel in a pre-defined distance or according to a predefined trajectory.

Finally the method according to a further embodiment may comprise step i2) lowering the draping unit towards the transverse material excess of the at least one ply that has been at least partially pulled over the mandrel until the draping unit contacts the at least one ply, picking up the transverse material excess of the at least one ply with the draping unit and lifting the transverse material excess in vertical direction to create an additional lifting location.

Additionally the method may comprise step i3) moving the draping unit at least in the transversal direction towards the other longitudinal edge of the lower mold.

Steps i2) and i3) may be performed during or after step i).

The advantage of creating an additional lifting location is that friction between the transverse material excess and the mandrel respectively other layers of the material layup that had been previously placed on the mandrel is minimized. This is a clear advantage over the manual production approach according to the prior art in that the transverse material excess is pulled essentially tangentially over the mandrel with the help of ropes. Besides, damages of the material the layup on top of the mandrel cannot be controlled by manual labor due to the radius of the blade. The laborer neither can assess/evaluate the layup on top of the mandrel nor reach it in order to adjust the placement location. The additional lifting location results in significantly less damages of the fiber structure of the ply and improves the overall quality of the material layup as wrinkles and/or creases can be avoided.

In particular the transversal location in that the draping unit picks up the transverse material excess in step i2) can be positioned between the longitudinal edge from that the transversal end section of the transverse material excess has been picked up by the gripping unit or the further gripping unit and a transversal center of the lower mold.

In embodiments it is possible that the draping unit in step i3) follows a movement curve of the gripping unit or further gripping unit that is being used to pull the transverse material excess over the mandrel. In embodiments it is further possible that the movement of the draping unit includes both a vertical and transversal component so that especially the draping unit follows a curvature of the mandrel in a predefined distance or according to a predefined trajectory.

The method according to the invention may be at least partly implemented in hardware and/or in software. If said method is implemented in hardware, it may be embodied as a device, e.g. as a computer or as a processor or as a part of a system, e.g. a computer system. If said method is implemented in software it may be embodied as a computer program product, as a function, as a routine, as a program code or as an executable object.

The embodiments and features described with reference to the apparatus of the present invention apply mutatis mutandis to the method of the present invention and vice versa.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

Further embodiments, features and advantages of the present invention will become apparent from the subsequent description and dependent claims, taken in conjunction with the ac-companying drawings, in which:

FIG. 11-FIG. 16 show flow charts of different embodiments of the method according to the invention.

In the Figures, like reference numerals designate like or functionally equivalent elements, unless otherwise indicated.

FIG. 1-FIG. 9 show the material layup apparatus 100 according to an embodiment of the invention in different operational states with a lower mold 20 respectively a mandrel 30 arranged within the mold receiving space 10. FIG. 1-FIG. 4 refer to the method steps of the lower layup while FIG. 5-FIG. 9 refer to the method steps of the upper layup.

Figure 1:
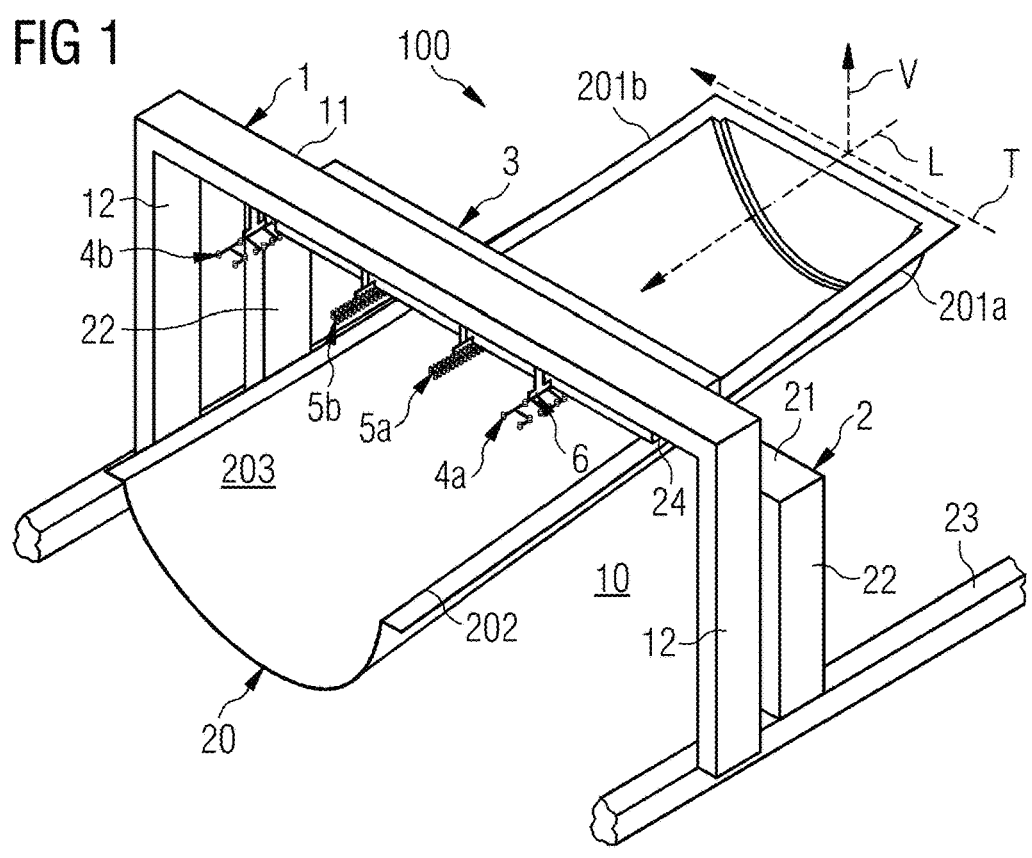
FIG. 1 shows an isometric view of the apparatus according to the invention in its home position, and a lower mold.

FIG. 1 shows the apparatus 100 in its home position that refers to a non-operational respectively idle state. The apparatus 100 comprises a first gantry 1 and a second gantry 2 that are individually moveable in the longitudinal direction L. The first 1 and second gantries 1,2 span over a mold receiving space 10 in that a lower mold 20 is received.

The lower mold 20 has a three-dimensional extension in the longitudinal direction L, the vertical direction V and the transversal direction T. The mold encloses an inner hollow space 203 that is adapted to receive the fiber plies 31 during the material layup process and has the shape of a negative form of the blade to be produced. The lower mold 20 has two opposing longitudinal edges 201a,201b that comprise a collar portion 202 that extends radially outwardly from the hollow inner space 203.

The first gantry 1 comprises a transversal beam 11 that is supported on either side by one support 12 comprising a vertical strut 12.

The second gantry 2 comprises a transversal beam 21 that is supported on either side by one support 22 comprising a vertical strut 22.

The movability of the first and second gantry 1,2 in the longitudinal direction L is realized in that the supports 12,22 of the first and second gantries 1,2 are guided on guide rails 23 wherein the guide rail 23 belongs to the second gantry 2 and the guide rail of the first gantry 1 is not shown. Each gantry 1,2 is associated with a pair of guide rails 23 that extend on transversally opposing sides of the mold receiving space 10.

The guide rails 23 run in parallel. The guide rail 23 of the second gantry 2 is—with respect to the transversal direction T—closer to a center of the mold receiving space 10 than a guide rail of the first gantry 1. This is to say the guide rails of the first gantry 1 extend transversally outwardly with respect to the guide rails of the second gantry 2.

The supports 12,22 of the first and/or second gantry 1,2 can be provided with one or more wheels so as to be guided on the respective guide rail 23. At least one wheel can be connected to a drive element, in particular an electric motor, to effect the movement in the longitudinal direction L along the respective guide rail 23.

The guide rails 23 can be fixated to the ground of a production facility in that the apparatus 100 is to be used.

A transversal extension of the second gantry 2 is smaller than a transversal extension of the first gantry 1. A vertical position of the transversal beam 21 of the second gantry 2 is lower than a vertical position of the transversal beam 11 of the first gantry 1.

The transversal beam 21 of the second gantry 2 provides a storage area 24 for a stack of fiber 3 plies 31.

At the transversal beam 11 of the first gantry 1 a gripping unit 4a is provided that is moveable both in the transversal direction T and the vertical direction V so as to be lowerable into and retractable from the mold receiving space. Further, a further gripping unit 4b, a draping unit 5a and a further draping unit 5b are provided at the transversal beam 11 of the first gantry 1 that are as well moveable both in the transversal direction T and the vertical direction V so as to be lowerable into and retractable from the mold receiving space.

Figure 2:
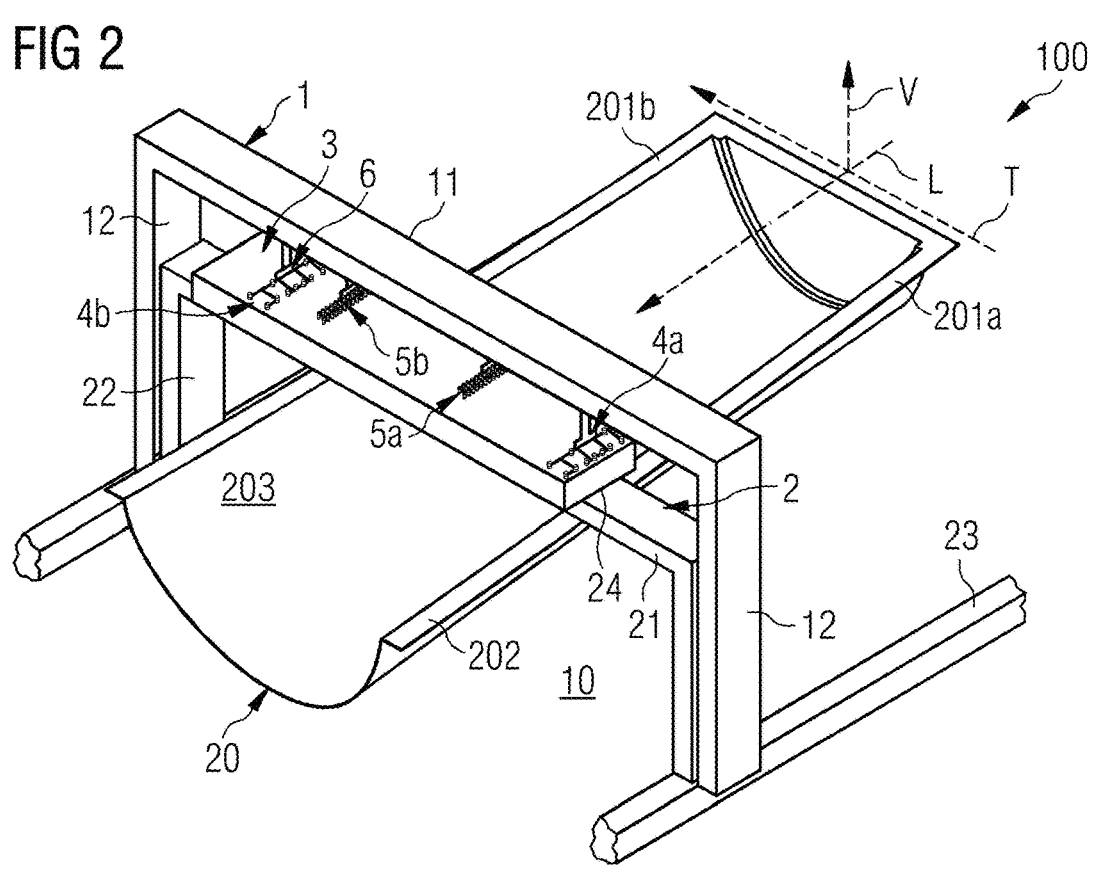
FIG. 2 shows an isometric view of the apparatus according to the invention with the second gantry in its ply-pickup position, and a lower mold.

The second gantry can be moved in the longitudinal direction L into a ply-pickup position in that the storage area 24 of the second gantry 2 is arranged under the at least one of the gripping units 4a,4b of the first gantry 1 so that at least one ply 31 of the fiber plies 31 provided on the stack 3 of fiber plies 31 can be picked up by at least one of the gripping units 4a,4b. This operational state that refers to step a) of the method according to the invention and is depicted in FIG. 2.

To pick up one ply 31 from the stack 3 the gripping unit 4a and the further gripping unit 4b are lowered in the vertical direction towards the stack 3 until the gripping unit 4a and the further gripping unit 4b contact the top ply 31; movement may be simultaneous or serially. Then the gripping unit 4a and the further gripping unit 4b are activated to effect gripping. To ensure effective separation of the plies 31 and to prevent too many plies 31 from being picked up the gripping unit 4a and the further gripping unit 4b are provided with a suitable end-effector comprising at least one needle gripper or a combined vacuum needle gripper 42a, 42b (see FIG. 3). This refers to step b) of the method according to the invention.

Subsequently both the gripping unit 4a and the further gripping unit 4b are moved in the vertical direction V to lift off the ply 31 that has just been picked from the stack 3, which refers to step c) of the method according to the invention (not shown in the drawings).

The draping unit 5a and further draping unit 5b are still in their home position and are inoperative.

In the next step (referring to step d) of the method according to the invention) the second gantry 2 is retracted in the longitudinal direction L so that the storage area 24 of the second gantry 2 is displaced longitudinally from the gripping units 4a,4b of the first gantry 1. This relative positioning of the two gantries 1,2 is shown in FIG. 3.

Figure 3:
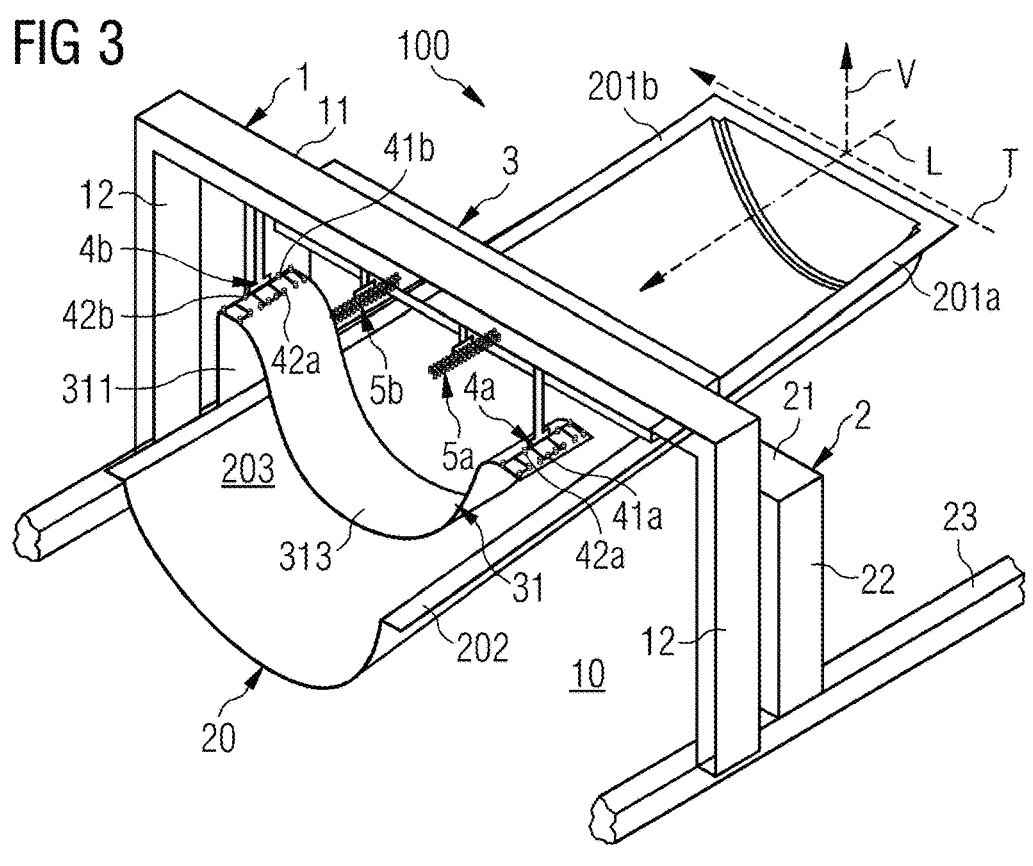
FIG. 3 shows an isometric view of the apparatus according to the invention in state of operation referring to the placing of a ply during the lower layup, and a lower mold.

As it can be observed in FIG. 3 the pickup of the ply 31 has been performed in a way that leaves a transverse material excess 311 beyond the further gripping unit 4b.

The length of the transverse material excess 311 is dimensioned so that it is at least as long as a circumferential length of an upper side of the mandrel 30 (see FIG. 5 to FIG. 9) so that both a lower side of the blade and an upper side of the blade comprise continuous fiber plies 31 around the full circumference of the entire blade.

Further subsequently the gripping unit 4a and the further gripping unit 4b are moved relatively transversally to decrease their distance so that the at least one ply 31 hangs freely between the gripping unit 4a and the further gripping unit 4b. The distance between the two gripping units 4a,4b is decreased to an extent so that a curvature of a free-hanging portion 313 of the ply 31 approximately corresponds to a curvature of the lower mold 20 at the current longitudinal position. This aims to place the ply 31 precisely into the lower mold 20. This process step mainly works due to the weight of the ply 31.

The transversal spacing between the gripping 4a unit and the further gripping unit 4b after the adjustment of the relative position corresponds to a circumferential length between the two opposing longitudinal edges 201a,201b of the lower mold 20. This is to say the aim of the adjustment of the distance is that the ply 31 can be placed into the lower mold 20 in a manner that neither creates excessive tension on the ply 31 nor leaves an unwanted material surplus that could create wrinkles. After the adjustment the gripping unit 4a is arranged above one of the longitudinal edges 201a of the lower mold 20 while the further gripping unit 4b is arranged above the other longitudinal edge 201b of the lower mold 20. This refers to step e1) of the method according to the invention. Then, the gripping unit 4a and the further gripping unit 4b are lowered in the vertical direction V towards the lower mold 20 until the ply 31 contacts the longitudinal edges 201a,201b of the lower mold 20.

The ply 31 is fixated at temporally on the longitudinal edges 201a, 201b by ply-fixation elements 204 comprising a rake structure (see FIG. 10) provided on either of the longitudinal edges 201a,201b. The ply-fixation elements 204 can have a pin and/or needle structure so that they are adapted to at least partially penetrate into a structure of the ply in order to fixate it properly.

In that the ply 31 is fixated at the longitudinal edge 201b of the lower mold 20 so that at least a portion of the transverse material excess 311 hangs down from the longitudinal edges 201b of the lower mold 20. In particular a transversal end section 312 of the transverse material excess 311 is fixated on the ply-fixation elements 204 as a top layer so that it can be picked up more easily in subsequent method steps.

As the gripping unit 4a and the further gripping unit 4b comprise a combined vacuum-needle gripper 42a,42b before finally placing the ply on the longitudinal edges 201a,201b of the lower mold 20 the needles of the combined vacuum-needle gripper 42a,42b are retracted and only vacuum suction is maintained so that the needles do not collide with the lower mold 20.

Figure 4:
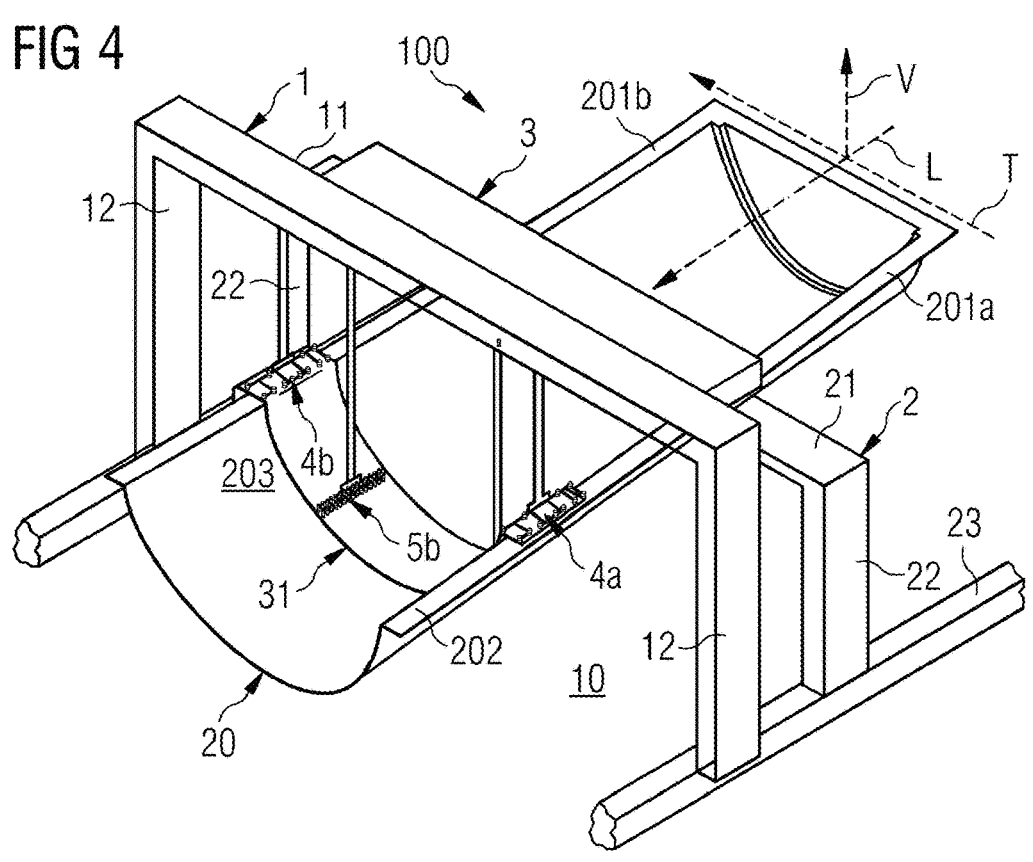
FIG. 4 shows an isometric view of the apparatus according to the invention in state of operation referring to the draping of a ply during the lower layup, and a lower mold.

After the ply 31 has been placed into the lower mold 30 the draping units 5a, 5b become operative, which is shown in FIG. 4. The draping units 5a,5b of the first gantry 1 are lowered towards the lower mold 20 until they contact the ply 31. The draping units 5a,5b apply a predefined pressure on the ply 31 and are moved in the transversal direction T while their vertical position V is continuously adapted to correspond to the curvature of the lower mold 20. By that the ply 31 being draped homogeneously into the lower mold 20 along its transversal T extension. The transversal draping-movement of the draping units 5a,5b starts at a transversal center of the lower mold and the draping units 5a,5b are moved simultaneously or serially towards to the longitudinal edges 201a, 201b. This movement redirects the ply 31 towards the longitudinal edges 201a,201b of the lower mold. This refers to step e2) of the method according to the invention.

According to the current manual draping approach regions near a transversal center of the lower mold cannot be sufficiently draped at all as the workers cannot reach it. This results in quality issues, mainly in the formation of wrinkles and/or bridges in the layup.

By starting the draping with two draping units 5a,5b in the transversal center of the lower mold 20, the draping process can be significantly facilitated, especially for large plies. This mainly results from the ply being "separated" into three sections: A finally draped middle section and two transversally outer sections still to be draped. The main purpose of the draping units 5a,5b during the lower layup is to ensure a proper draping of the ply in a transversal middle section of the lower mold 20. Transversally outer sections of the lower mold may however be draped with sufficient quality mainly by the described adjustment of the transversal spacing between the gripping units 4a,4b.

The adjustment of the transversal spacing between the gripping units 4a,4b is of utmost importance. If the position of the gripping units 4a,4b or the draping units 5a,5b does not match the predefined positions, the overall layup- and material quality may be decreased due to excessive transversal forces that can damage the plies. On the other side, a totally stress-free layup is also disadvantageous due to wrinkling. A reliable trade-off must be reached in order to enhance the draping process but also prevent material damages.

In order to avoid material damage, bridging and wrinkles high gripping and layup precisions are required.

After the draping has been completed the draping units 5a,5b may retract in the vertical direction V and return to their home or idle position.

Then—simultaneously or serially—the gripping units 4a,4b are de-activated and are as well retracted in the vertical direction V.

The person skilled in the art will understand that the lower layup practically is not completed with one ply 31. In practical implementations the aforementioned method steps are repeated as often as necessary to place and drape the number of plies 31 required according to the technical specifications of a certain blade into the lower mold 20. In that the steps of the method according to the invention relating to the lower layup are repeated multiple times and at different longitudinal positions of the lower mold 20. However, for simplicity reasons herein the process is depicted and described for an isolated ply 31 at exclusively one longitudinal position of the lower mold 20. This expressly does not limit the invention in any way.

After at least one mandrel 30 has been placed inside the lower mold 20 on top of the at least one ply 31 the upper layup begins.

Figure 5:
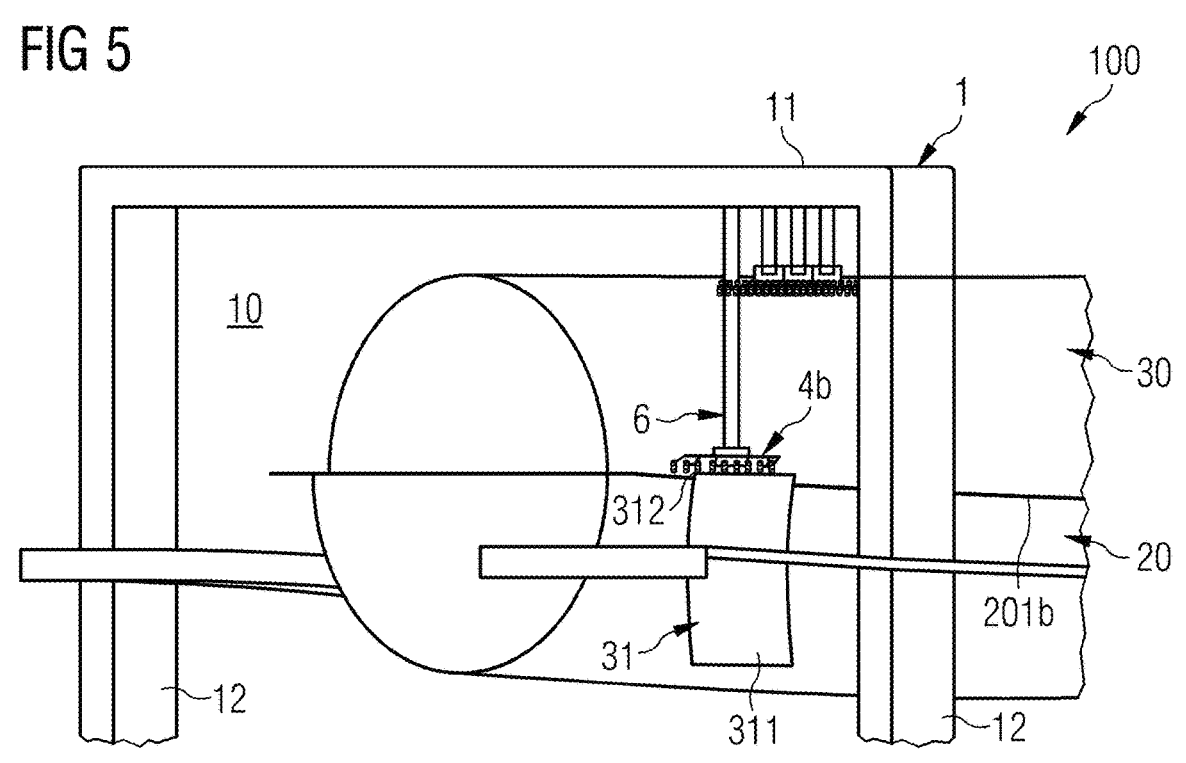
FIG. 5 shows an isometric view of the apparatus according to the invention in state of operation referring to the pickup of the transverse material excess during the upper layup, and a lower mold and a mandrel.

Referring to FIG. 5 now:

The transversal end section 312 of the transverse material excess 311 is gripped by the further gripping unit 4. Therein the vacuum grippers 41b or the combined vacuum-needle grippers 42b or both may be used. This refers to step h) of the method according to the invention.

Figure 6:
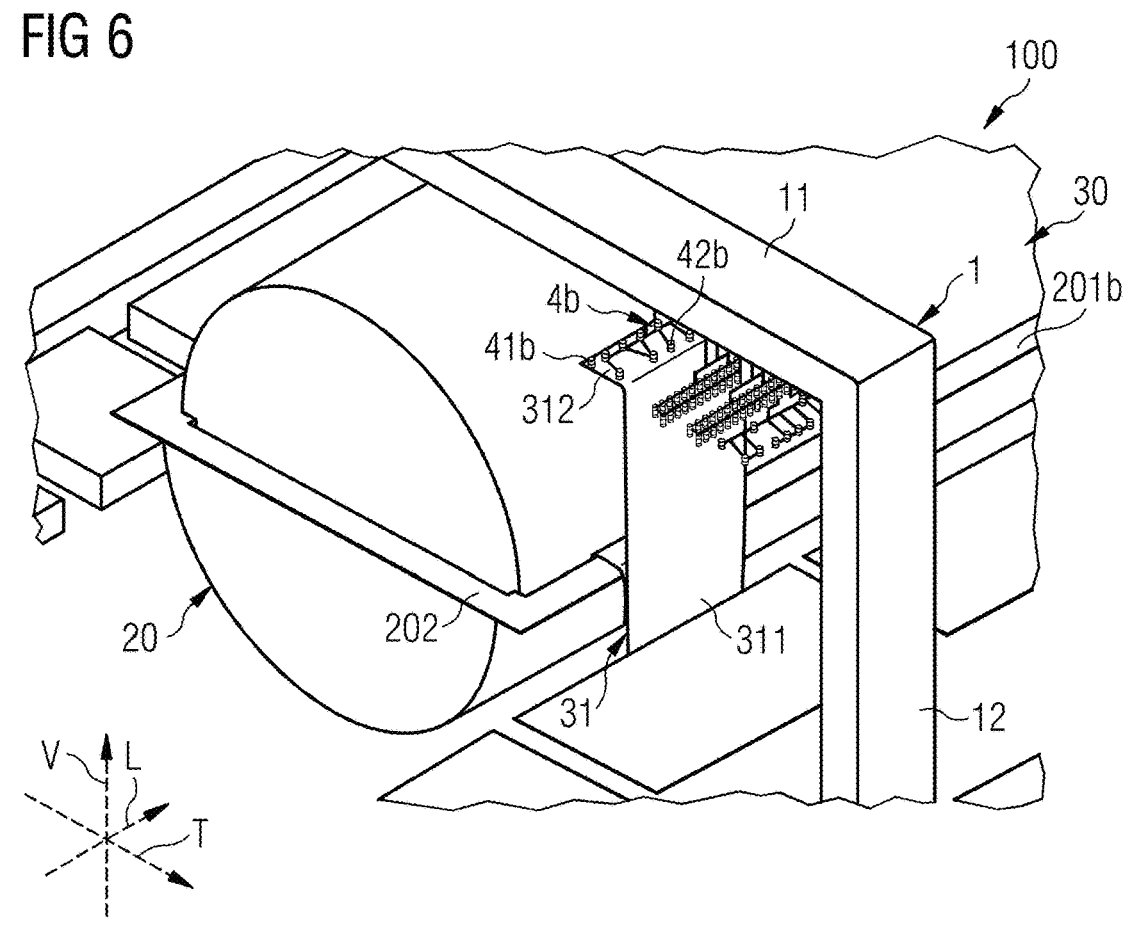
FIG. 6 shows an isometric view of the apparatus according to the invention in state of operation referring to the vertical lifting of the transverse material excess during the upper layup, and a lower mold and a mandrel.

Subsequently—which is shown in FIG. 6—the transverse material excess 311 is lifted by moving the further gripping unit 4b in the vertical direction V. The further gripping 4b unit may be in particular moved to a position that—in the vertical direction—is located above an upper boundary of the mandrel 30. Lifting the transverse material excess 311 in the vertical direction has the advantage that friction between the transverse material excess 311 and the mandrel 30 respectively other layers of the material layup that had been previously placed on the mandrel 30 is minimized which reduces the risk of damaging the fiber structure of the plies 31 involved. This is crucial not only when placing the ply above already placed plies but especially when placing the first layer above the core material (balsawood, plastic foams etc.).

Figure 7:
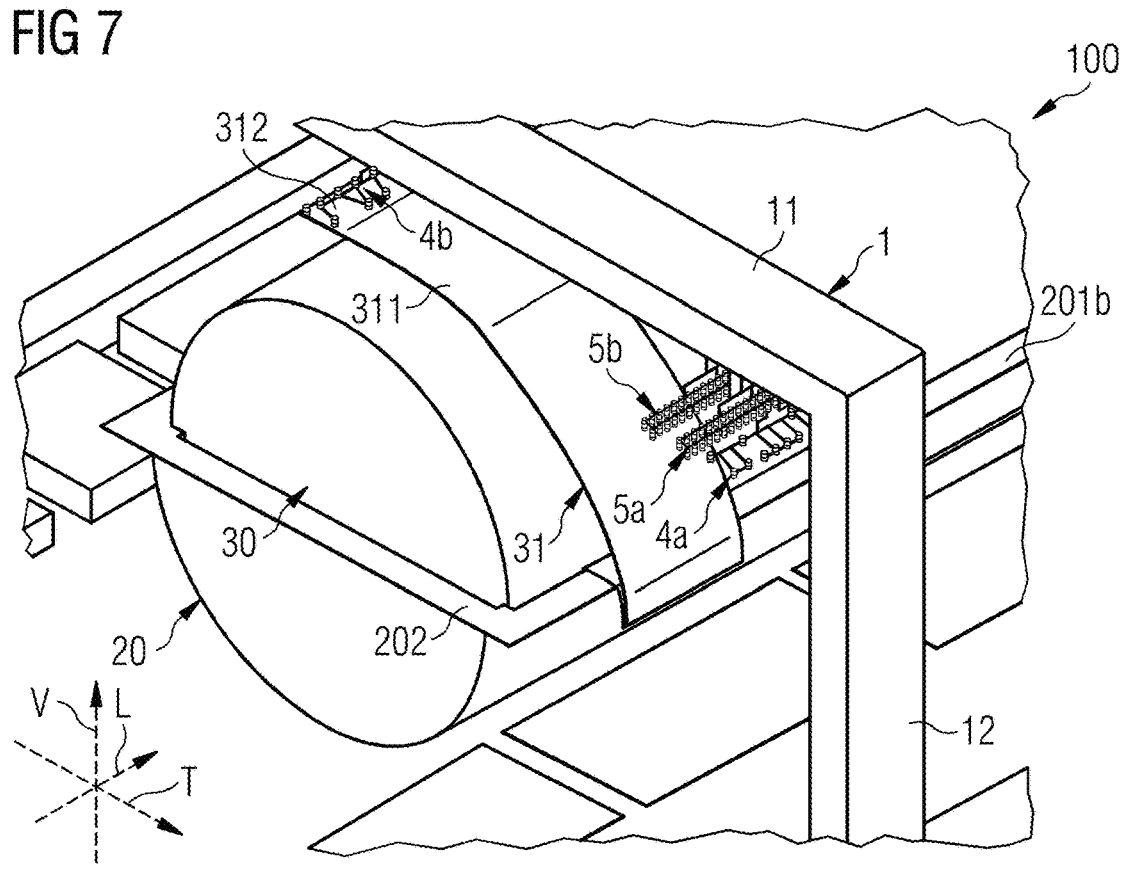
FIG. 7 shows an isometric view of the apparatus according to the invention in state of operation referring to pulling the transverse material excess over the mandrel during the upper layup, and a lower mold and a mandrel.

Further subsequently—which is shown in FIG. 7—the further gripping unit 4b is at least moved in the transversal direction T to pull the transverse material excess 311 over the mandrel 30. This refers to a portion of step i) according to the invention. In that it is possible that the movement of the further gripping unit 4b includes both a vertical and transversal component. In particular, it can be possible that the further gripping unit 4b is moved so as to follow a curvature of the mandrel 30 in a pre-defined distance or according to a predefined trajectory.

Figure 8:
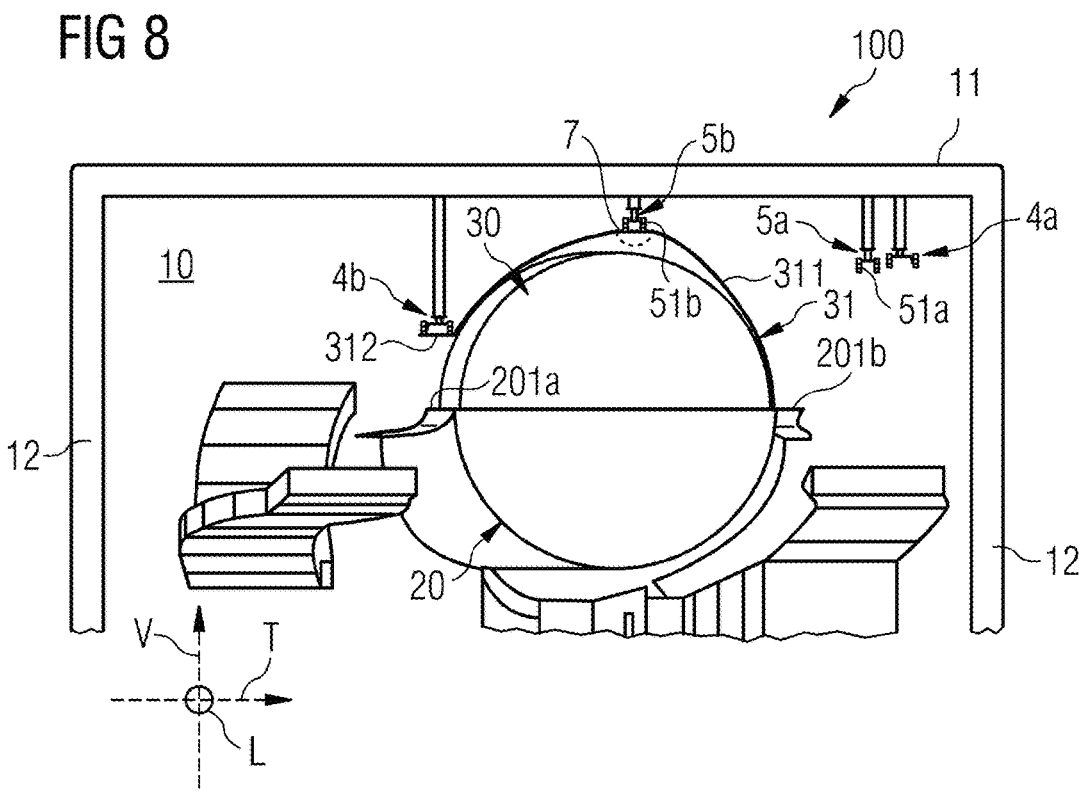
FIG. 8 shows a side view of the apparatus according to the invention in state of operation referring to creating an additional lifting location for the transverse material excess during the upper layup, and a lower mold and a mandrel.

Meanwhile one of the draping units 5b is lowered towards the transverse material excess 311 that has been at least partially pulled over the mandrel 30 until the draping unit 5b contacts the at least one ply 31. The transverse material excess 311 of the ply 31 is picked up with the draping unit 5b and lifted in vertical direction V to create an additional lifting location 7. Subsequently the draping unit 5b is at least moved in the transversal direction T towards the other longitudinal edge 201a. This is depicted in FIG. 8 and refers to steps i2) and i3) according to the invention. In that it is possible that the movement of the draping unit 5b includes both a vertical and transversal component so that the draping unit may follow a curvature of the mandrel 30 in a predefined distance or is moved according to a predefined trajectory. This has the advantage that a surface area in that the transverse material excess 311 abuts against the mandrel 30 respectively other layers of the material layup that had been previously placed on the mandrel 30 is minimized and consequently a relative tangential movement that creates shear forces that can damage the fiber structure of the plies 31 is avoided.

Figure 9:
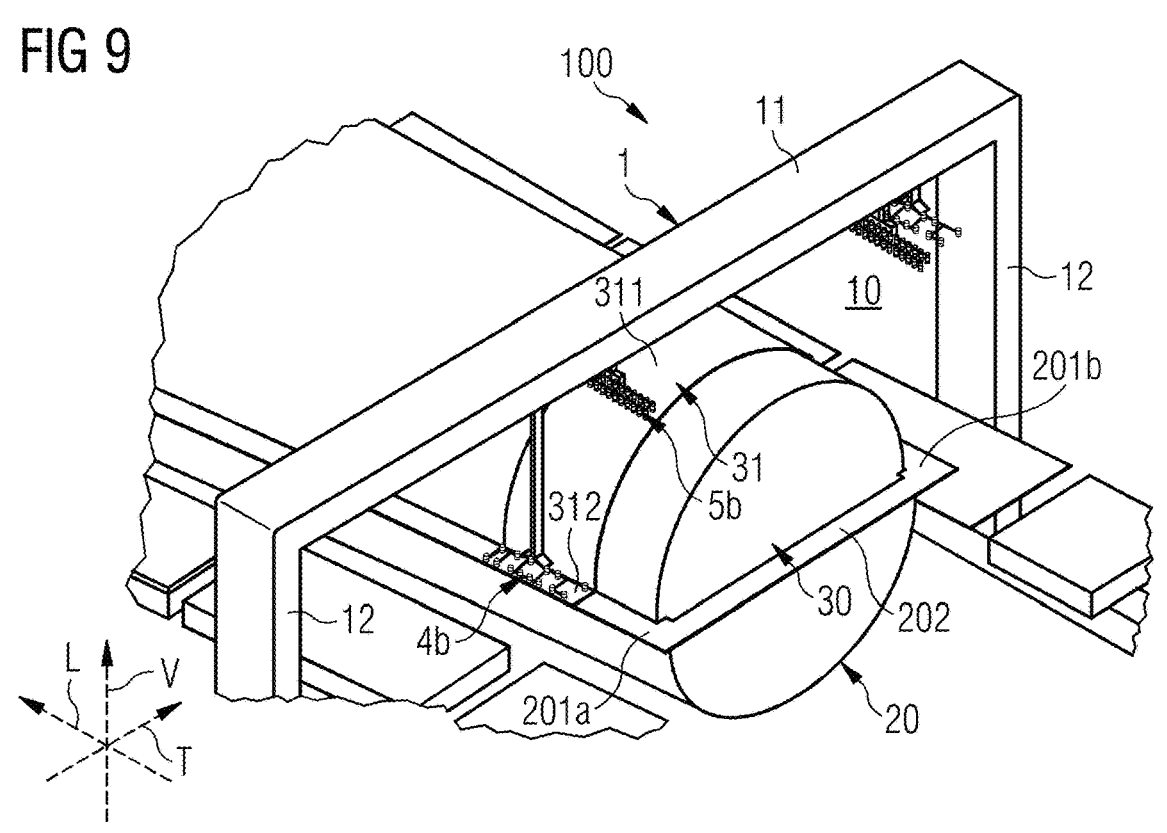
FIG. 9 shows an isometric view of the apparatus according to the invention in state of operation referring to fixating the transversal end section of the transverse material excess at a longitudinal edge of the lower mold, and a lower mold and a mandrel.

Lastly—now referring to FIG. 9—after the further gripping unit 4b has reached a transversal position of the other longitudinal edge 201a the further gripping unit 4b is lowered until the transversal end section 311 of the transverse material excess 311 contacts the other longitudinal edge 201a of the lower mold 20. The transversal end section 312 of the transverse material excess 311 is fixated at the other longitudinal edge 201a of the lower mold 20, in particular on the ply-fixation elements 204 (see FIG. 10) provided thereon. This corresponds to a portion of step j) through step k) of the method according to the invention.

After the upper layup has been repeated as often as necessary to place all plies required according to the technical specifications of a certain blade along the longitudinal extension of the mold, an upper mold is placed on the lower mold. A cavity between lower mold, upper mold and mandrel is subsequently evacuated so that the material layup is compressed in the cavity and a hardenable resin material is injected into the cavity. After curing the resin, which can be assisted by application of increased temperature, the upper and lower mold can be separated and the mandrel can be removed.

The person skilled in the art will understand that the utilization of the further gripping unit 4b and the further draping unit 5b during the upper layup is explicitly exemplary.

The process steps of the upper layup may be equally performed by the gripping unit 4a and the draping unit 5a.

In the lower layup as well in the upper layup it is obvious that sandwich core materials such as balsawood, plastic foams and the like may be inserted between the plies used in the layup. Additionally or alternatively before or together with inserting the mandrel on top of the lower layup at least one shear web may be positioned inside of the lower mold. The shear web may be connected to the upper and lower shell during the curing process of the injected resin.

Figure 10:
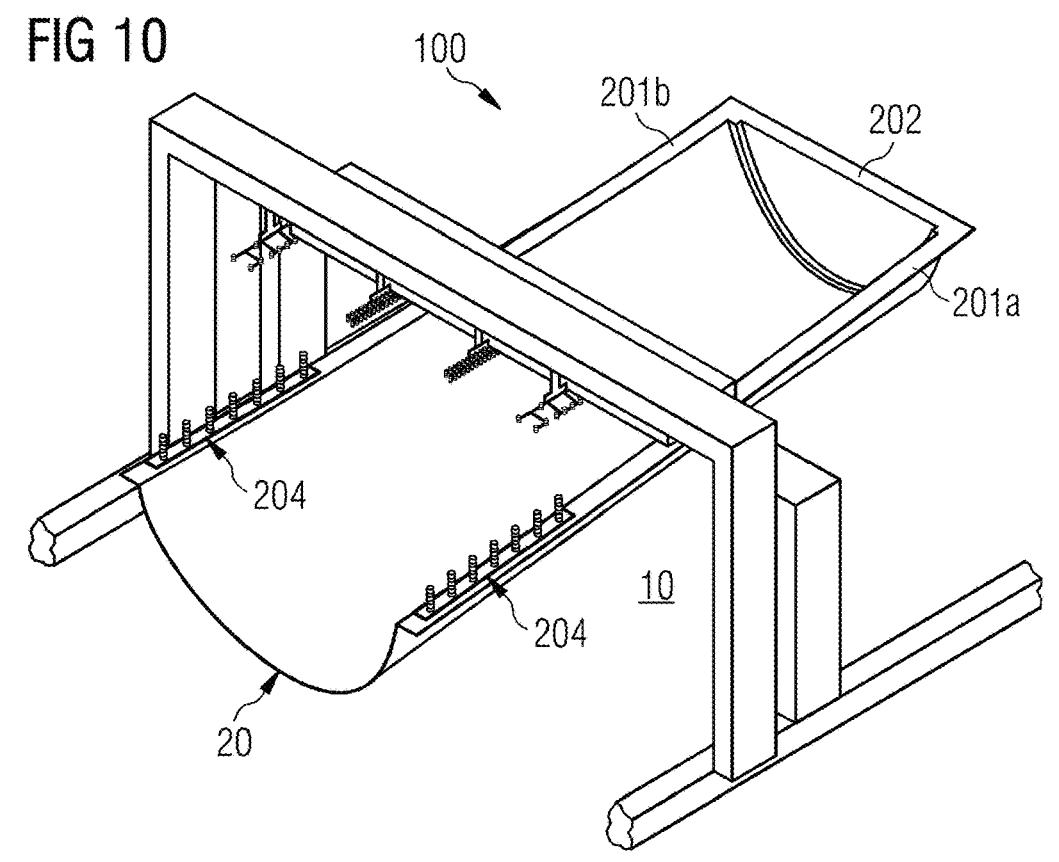
FIG. 10 shows an isometric view of the apparatus according to the invention in its home position, and a lower mold with ply-fixation elements on the longitudinal edges of the lower mold.
Figures 11, 12:
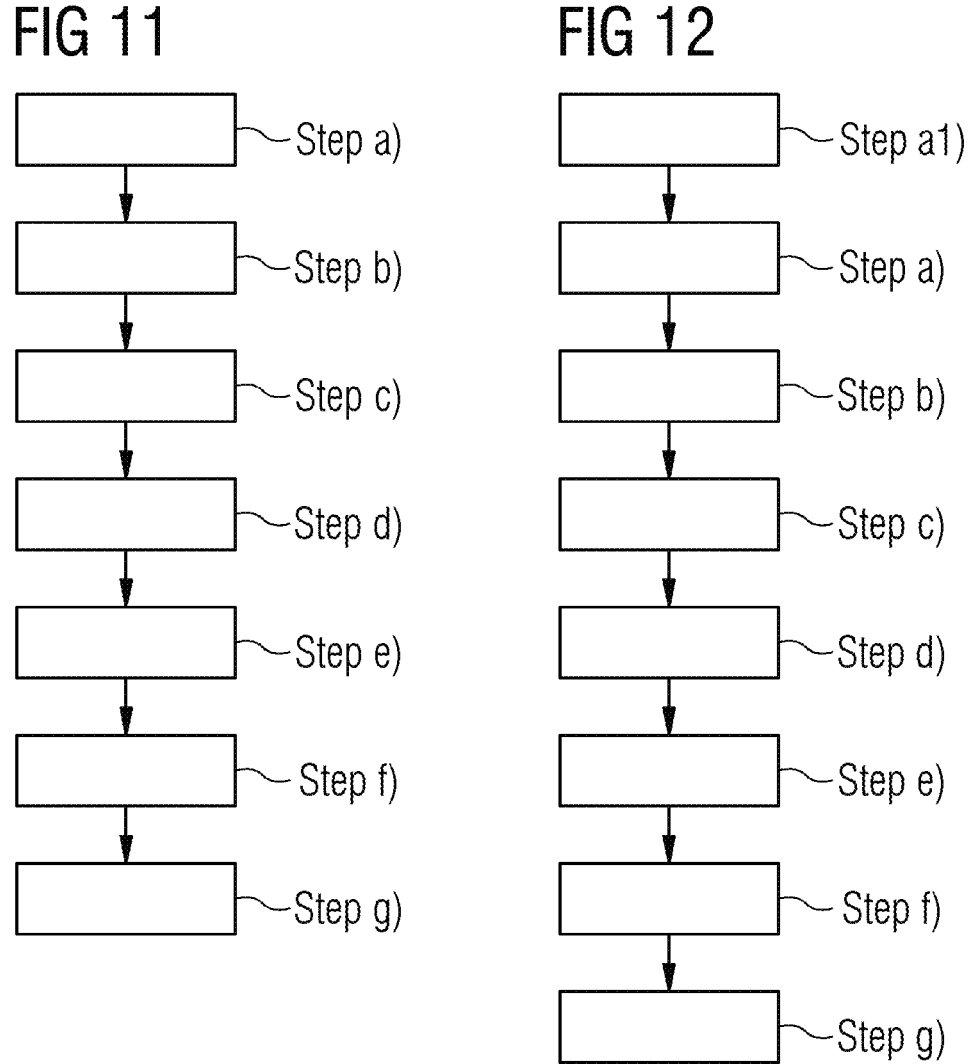
Figures 15, 16:
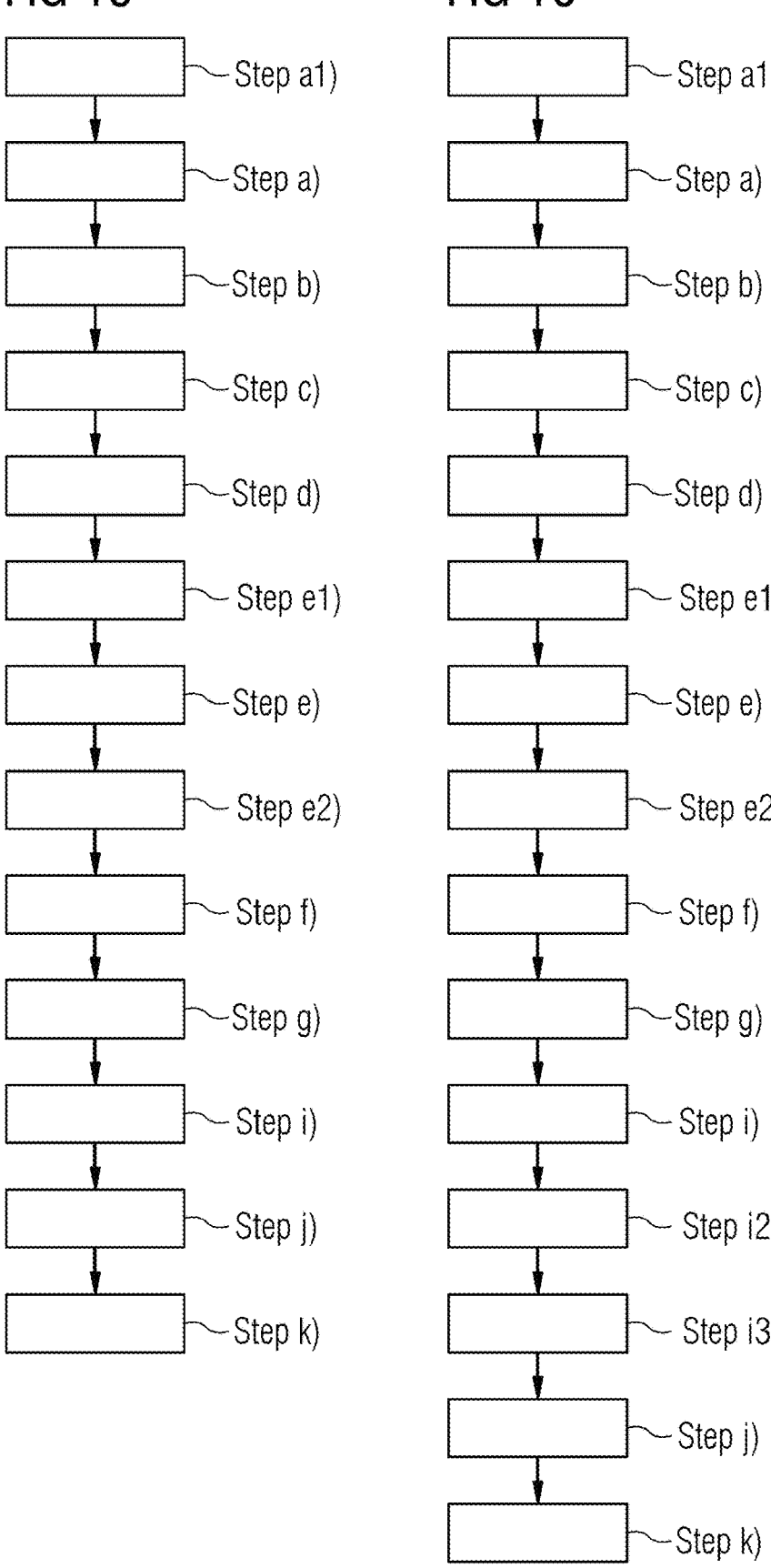

FIG. 10 shows the apparatus 100 in its home or idle position that has been depicted in FIG. 1. At the two opposing longitudinal edges 201a, 201b ply-fixation elements 204 having a rake-like structure are arranged at the collar portion 202 of the lower mold 20. The ply-fixation elements 204 are removable from the collar portion 202 and are used as an auxiliary tooling at a current longitudinal position that is currently being processed with the apparatus 100.

FIG. 11 through FIG. 16 show flow charts that illustrate the successive execution of method steps of various embodiments of the method according to the invention. In the light of the disclosure given by the claims and the specification they are comprehensible by themselves and do not require further elaboration.

Although the present invention has been described in accordance with preferred embodiments, it is obvious for the person skilled in the art that modifications are possible in all embodiments.

The invention claimed is:

1. A material layup apparatus (100) for producing wind turbine blades using fiber plies (31), comprising:

a first gantry (1) comprising a transversal beam (11) extending over a mold receiving space (10) in a transversal direction (T) of the mold receiving space (10), the mold receiving space provided with a lower mold (20) having the shape of at least a portion of a wind turbine blade, the first gantry (1) further comprising at least one gripping unit (4a, 4b) attached to the transversal beam (11) that is moveable both in the transversal direction (T) and in a vertical direction (V) so as to be lowerable into and retractable from the mold receiving space (10), a second gantry (2) comprising a transversal beam (21) extending over the mold receiving space (10) in the transversal direction (T) of the mold receiving space (10), wherein the second gantry (2) provides a storage area (24) for a stack (3) of fiber plies (31), wherein the first and second gantry (1,2) are moveable along a longitudinal direction (L) of the mold receiving space (10), and wherein the second gantry (2) is adapted to be moveable in the longitudinal direction (L) into a ply-pickup position in that the storage area (24) of the second gantry (2) is arranged under the at least one gripping unit (4a, 4b) of the first gantry (1) so that at least one ply (31) of the fiber plies (31) provided on the stack (3) of fiber plies (31) can be picked up by the at least one gripping unit (4a, 4b).

2. The apparatus (100) according to claim 1, wherein the at least one gripping unit (4a, 4b) comprises a gripping unit (4a) and a further gripping unit (4b) attached to the transversal beam (11) of the first gantry and moveable both in the transversal direction (T) and in the vertical direction (V) so as to be lowerable into and retractable from the mold receiving space (10).

3. The apparatus (100) according to claim 1, wherein the first gantry (1) comprises at least one draping unit (5a, 5b) attached to the transversal beam (11) of the first gantry and moveable both in the transversal direction (T) and in the vertical direction (V) so as to be lowerable into and retractable from the mold receiving space (10).

4. The apparatus (100) according to claim 3, wherein the at least one gripping unit (4a, 4b), and the at least one draping unit (5a, 5b) comprise an end-effector selected from the group comprising a vacuum gripper (41a, 41b, 51a), a needle gripper, a finger gripper and a combined vacuum-needle gripper (42a, 42b).

5. The apparatus (100) according to claim 3, wherein the at least one gripping unit (4a, 4b) and the at least one draping unit (5a, 5b) are attached to a cartesian robot (6) mounted to the transversal beam (11) of the first gantry (1).

6. The apparatus (100) according to claim 1, wherein the first and/or second gantry (1,2) are guided in the longitudinal direction (L) of the mold receiving space (10) on at least one guide rail (23), and/or wherein the transversal beam (11,21) of the first and/or second gantry (1,2) have a larger transversal extension than the mold, wherein the transversal beam (21) of the second gantry (2) has a smaller transversal extension than the transversal beam (11) of the first gantry (1).

7. A material layup method for producing wind turbine blades using fiber plies (31), using an apparatus (100) of claim 1, comprising the steps of: a) moving the second gantry (2) in the longitudinal direction (L) into the ply-pickup position in that the storage area (24) of the second gantry (2) is arranged under the at least one gripping unit (4a, 4b) of the first gantry (1), b) lowering the at least one gripping unit (4a, 4b) of the first gantry (1) in the vertical direction (V) towards the storage area (24) of the second gantry (2), activating the at least one gripping unit (4a, 4b) and picking up at least one ply (31) of the fiber plies (31) provided on the stack (3) of fiber plies (31) with the at least one gripping unit (4a, 4b), c) moving the at least one gripping unit (4a, 4b) in the vertical direction (V) to lift off the at least one ply (31) of the stack (3) of fiber plies (31), d) retracting the second gantry (2) in the longitudinal direction (L) so that the storage area (24) of the second gantry (2) is displaced longitudinally from the at least one gripping unit (4a, 4b) of the first gantry (1), e) lowering the at least one gripping unit (4a, 4b) of the first gantry (1) towards the lower mold (20) and placing the at least one ply (31) on a surface of the lower mold (20), f) de-activating the at least one gripping unit (4a, 4b) and retracting the at least one gripping unit (4a, 4b) in the vertical direction (V), and g) placing a mandrel (30) inside the lower mold (20) on top of the at least one ply (31) placed inside the lower mold (20).

8. The method according to claim 7, wherein the at least one gripping unit (4a, 4b) comprises a gripping unit (4a) and a further gripping unit (4b) attached to the transversal beam (11) of the first gantry and moveable both in the transversal direction (T) and in the vertical direction (V) so as to be lowerable into and retractable from the mold receiving space (10), wherein step b) comprises;

lowering the gripping unit (4a) and the further gripping (4b) unit of the first gantry (1) in the vertical direction (V) towards the storage area (24) of the second gantry (2), activating the gripping unit (4a) and the further gripping unit (4b) and picking up at least one ply (31) of the fiber plies (31) provided on the stack (3) of fiber plies (31) with the gripping unit (4a) and the further gripping unit (4b); wherein step c) comprises:

moving the gripping unit (4a) and the further gripping unit (4b) in the vertical direction (V) to lift off the at least one ply (31) of the stack (3) of fiber plies (31), wherein step e) comprises:

lowering the gripping unit (4a) and the further gripping unit (4b) of the first gantry (1) towards the lower mold (20) and placing the at least one ply (31) on the surface of the lower mold (20); and wherein step f) comprises;

de-activating the gripping unit (4a) and the further gripping unit (4b) and retracting the gripping unit (4a) and the further gripping unit (4b) in the vertical direction (V);

wherein the gripping unit (4a) and the further gripping unit (4b) are operated simultaneously.

9. The method according to claim 8, wherein in step b) the gripping unit (4a) and the further gripping unit (4b) pick up the same at least one ply (31) in opposing transversal sections thereof and wherein in step e) the gripping unit (4*a*) and the further gripping unit (4*b*) place the same at least one ply (31) on opposing longitudinal edges (201*a*, 201*b*) of the lower mold (20).

10. The method according to claim 9, wherein the method comprises step a1) of placing ply-fixation elements (204), comprising a rake structure or finger structure, on the opposing longitudinal edges (201*a*, 201*b*) of the lower mold (20), and wherein in step e) the gripping unit (4*a*) and the further gripping unit (4*b*) fixate the same at least one ply (31) on the ply-fixation elements (204) on the opposing longitudinal edges (201*a*, 201*b*) of the lower mold (20).

11. The method according to claim 10, wherein the method comprises step e1) relatively transversally moving the gripping unit (4*a*) and the further gripping unit (4*b*) to decrease their distance so that the same at least one ply (31) hangs freely between the gripping unit (4*a*) and the further gripping unit (4*b*) with a curvature that approximately corresponds to a curvature of the lower mold (20), wherein step e1) is performed before step e).

12. The method according to claim 10, wherein in step b) the same at least one ply (31) is picked so that a transverse material excess (311) thereof is provided beyond the gripping unit (4*a*) or the further gripping unit (4*b*) and wherein in step e) the same at least one ply (31) is placed into the lower mold (20) so that at least a portion of the transverse material excess (311) hangs down from one of the longitudinal edges (201*a*, 201*b*) of the lower mold (20), wherein a transversal end section (312) of the transverse material excess (311) is fixated on the ply-fixation elements (204) on one of the longitudinal edges (201*a*, 201*b*) of the lower mold (20).

13. The method according to claim 12, comprising the steps h) picking up the transversal end section (312) of the transverse material excess (311) with the gripping unit (4*a*) or the further gripping unit (4*b*) and lifting the transverse material excess (311) by moving the gripping unit (4*a*) or the further gripping unit (4*b*) used to pick up the transversal end section (312) of the transverse material excess (311) in the vertical direction (V), i) moving the gripping unit (4*a*) or further gripping unit (4*b*) used to pick up the transversal end section (312) of the transverse material excess (311) at least in the transversal direction (T) to pull the transverse material excess (311) over the mandrel (30) placed in the lower mold (20) until the gripping unit (4*a*) or further gripping unit (4*b*)

used to pick up the transversal end section (312) of the transverse material excess (311) reaches a transversal position of the other longitudinal edge (201*a*, 201*b*) of the lower mold (20), j) lowering the gripping unit (4*a*) or further gripping unit (4*b*) used to pick up the transversal end section (312) of the transverse material excess (311) unit until the transversal end section (312) of the transverse material excess (311) contacts the other longitudinal edge (201*a*, 201*b*) of the lower mold (20), and k) fixating the transversal end section (312) of the transverse material excess (311) at the other longitudinal edge (201*a*, 201*b*) of the lower mold (20), on the ply-fixation elements (204) provided thereon, wherein steps h) to k) are performed after step g).

14. The method according to claim 13, comprising lowering at least one draping unit (5*a*, 5*b*) towards the transverse material excess (311) of the at least one ply (31) that has been pulled over the mandrel (30) until the at least one draping unit (5*a*, 5*b*) contacts the at least one ply (31), picking up the transverse material excess (311) of the at least one ply (31) with the at least one draping unit (5*a*, 5*b*) and lifting the transverse material excess (311) in the vertical direction (V) to create an additional lifting location (7), and moving the at least one draping unit (5*a*, 5*b*) at least in the transversal direction (T) towards the other longitudinal edge (201*a*, 201*b*) of the lower mold (20).

15. The method according to claim 7, wherein the first gantry (1) comprises at least one draping unit (5*a*, 5*b*) attached to the transversal beam (11) of the first gantry and moveable both in the transversal direction (T) and in the vertical direction (V) so as to be lowerable into and retractable from the mold receiving space (10), wherein the method comprises: step e2) lowering the at least one draping unit (5*a*, 5*b*) of the first gantry (1) towards the lower mold (20) until the at least one draping unit (5*a*, 5*b*) contacts the at least one ply (31) placed in the lower mold (20), through the at least one draping unit (5*a*, 5*b*) applying a predefined pressure on the at least one ply (31), and moving the at least one draping unit (5*a*, 5*b*) in the transversal direction (T) while continuously adjusting a vertical position (V) of the at least one draping unit (5*a*, 5*b*) to correspond to a curvature of the lower mold (20) so that the at least one ply (31) is draped homogeneously into the lower mold (20) along the transversal (T) extension; wherein step e2) is performed after step e) and before step f).

* * * * *